INVENTORS
GILBERT H. SKOPP
CHARLES J. LITZ, JR.

Feb. 12, 1963 G. H. SKOPP ET AL 3,077,325
LOAD POSITIONING DEVICE
Filed Feb. 13, 1961 2 Sheets-Sheet 2
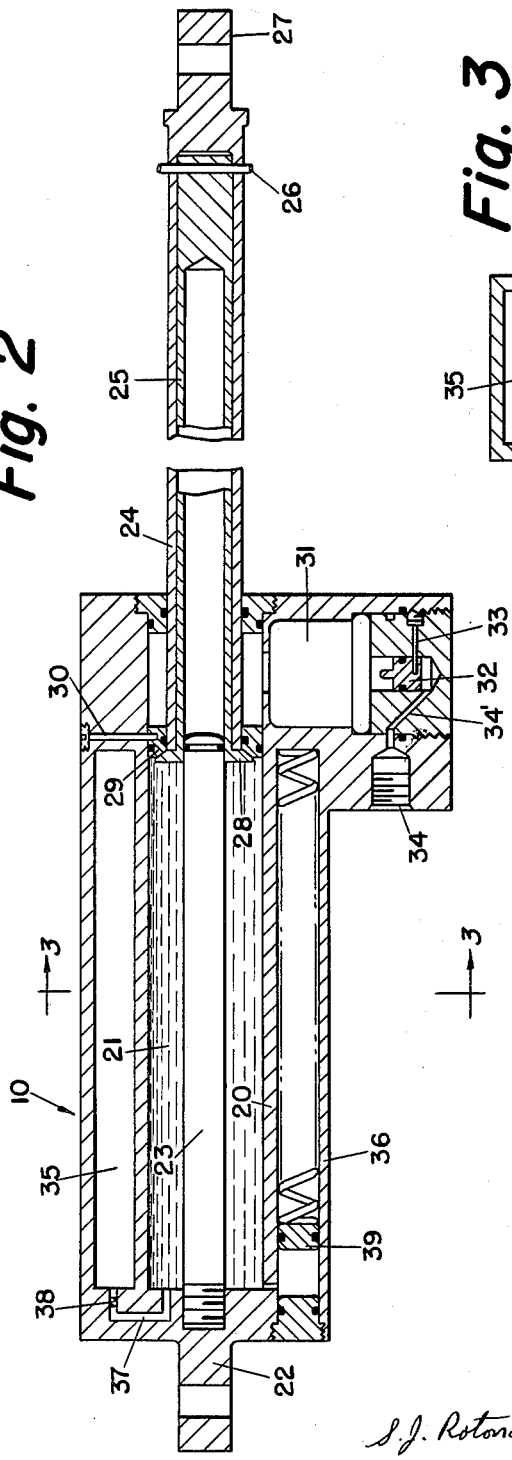
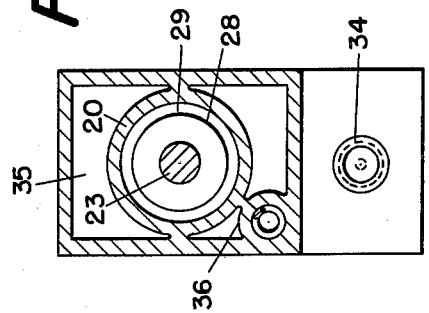
INVENTORS
GILBERT H. SKOPP
CHARLES J. LITZ, JR.
BY
S.J. Rotondi, A.J. Dupont & S. Dubroff
ATTORNEYS

United States Patent Office 3,077,325
Patented Feb. 12, 1963

3,077,325
LOAD POSITIONING DEVICE
Gilbert H. Skopp, Levittown, and Charles J. Litz, Jr., Philadelphia, Pa., assignors to the United States of America as represented by the Secretary of the Army
Filed Feb. 13, 1961, Ser. No. 89,077
3 Claims. (Cl. 244—122)
(Granted under Title 35, U.S. Code (1952), sec. 266)

The invention described herein may be manufactured and used by or for the Government for governmental purposes without the payment to us of any royalty thereon.

This invention relates to load actuating devices of the explosive cartridge operated type, and more particularly to a device which is operable to position the seat of a pilot prior to his ejection from a disabled aircraft.

Various types of cartridge operated devices are presently available for effecting the various motions incident to the operation of an aircraft escape system. These devices are generally of the one-shot type, and function merely to move the load only in one direction and from one fixed position to another. The device of the present invention is distinguished from these presently available devices by the fact that it permits manual movement of the load throughout its entire range of movement both before and after the firing of the cartridge by which the operating gas is generated.

The invention will be better understood from the following description when considered in connection with the accompanying drawings and its scope is indicated by the appended claims.

Referring to the drawings:

FIG. 2 is a longitudinal sectional view of a thruster which forms a part of the system of FIG. 1, FIG. 3 illustrates a section taken on the line 3—3 of FIG. 2 and looking in the direction indicated by the arrow heads.

Figure 1:
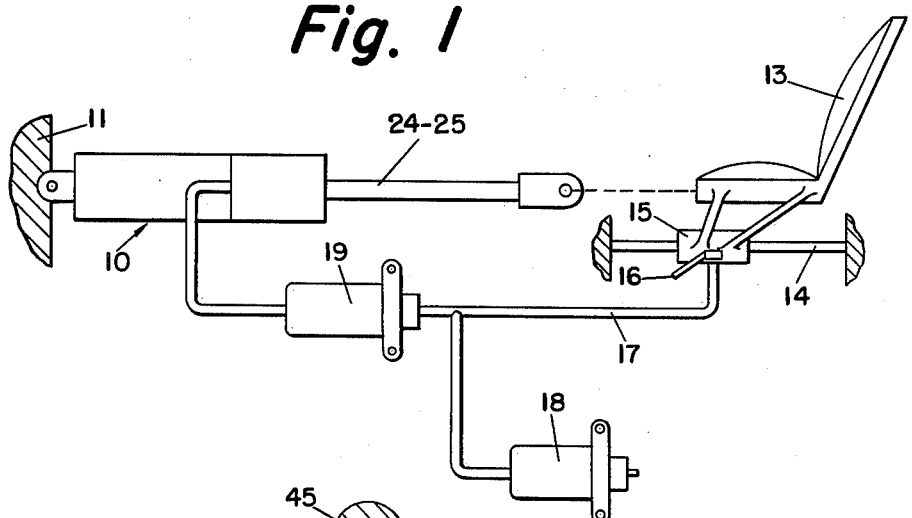
FIG. 1 illustrates a seat positioning system.

The seat positioning system of FIG. 1 includes a thruster 10 which is fixed to a support 11 and has a piston rod 24—25 fixed to a seat 13, this rod and seat being shown as spaced from one another in order to clarify the drawing. The seat is movable along a support 14 and is locked thereto by a latch or clutch 15. The clutch 15 may be operated to release the seat so that it is movable along the support 14. This is accomplished either manually by means of a handle 16 or by a gas pressure applied through a hose 17.

A gas pressure for operating the clutch 15 is generated by an initiator 18 which may be fired electrically or otherwise as desired a part of the gas generated by the firing of the initiator 18 is utilized to fire a delay unit 19 which may embody a slow burning powder and applies a gas pressure to the main piston of the thruster 10 immediately following the opening of the clutch 15.

The details of the thruster 10 are shown in FIGS. 2 and 3. It includes a main cylinder 20, which encloses a damping fluid or oil 21 and has an end cap 22 which is fixed to the support 11 (FIG. 1). A guide rod 23 is fixed to the end cap 22 and extends into the cylinder 20.

A piston rod consisting of two concentric tubular members 24 and 25, fixed together by a pin 26, are movable along the rod 23. The outer member 24 has a load actuating member 27 at its outer end. The inner member 25 has an outwardly extending flange 28 at its inner end.

A main piston 29 is fixed to the main cylinder 20 by a shear pin 30 and is movable against the flange 28 upon the shearing of this pin.

Associated with the main cylinder 20 are a chamber 35 and an auxiliary cylinder 36. A metering passageway 37 extends between the main cylinder 20 and the chamber 35 and contains a pressure rupturable disk 38. The auxiliary cylinder 36 opens into the main cylinder 20 and encloses a spring biased piston 39.

With the various parts of the thruster in their illustrated positions and the seat 13 (FIG. 1) released so as to be movable along its support 14, the piston rod 24—25 may be moved manually through its complete stroke. This follows from the fact that the pressure produced in the damping liquid 21 by such movement is absorbed by the spring back of the piston 39, and this pressure is too small to rupture the pressure rupturable disk 38 in the metering passageway 37.

The main piston 29 is actuated by the application of a gas pressure generated by the firing of a cartridge 31. This cartridge is fired by a firing pin 32 which is anchored in place by a shear pin 33 and is actuated by a gas pressure applied through an inlet 34 and a passageway 35.

Firing of the cartridge 31 generates a gas pressure whereby the main piston 29 is driven from its illustrated position to the opposite end of the main cylinder 20. As the piston starts to move, there is created in the damping fluid 21 a pressure which ruptures the disk 38. Thereafter the constant area metering passageway 37 so controls the flow of damping fluid from the main cylinder 20 to the chamber 35 that the oil exerts a resistive force which tends to stop the piston 29. This resistive force is proportional to the square of the velocity of the piston. Hence the constant area passageway functions as a shock absorber, slowing down the piston 29 to a point where the resistive force of the oil equals the force exerted by the piston.

Figure 4:
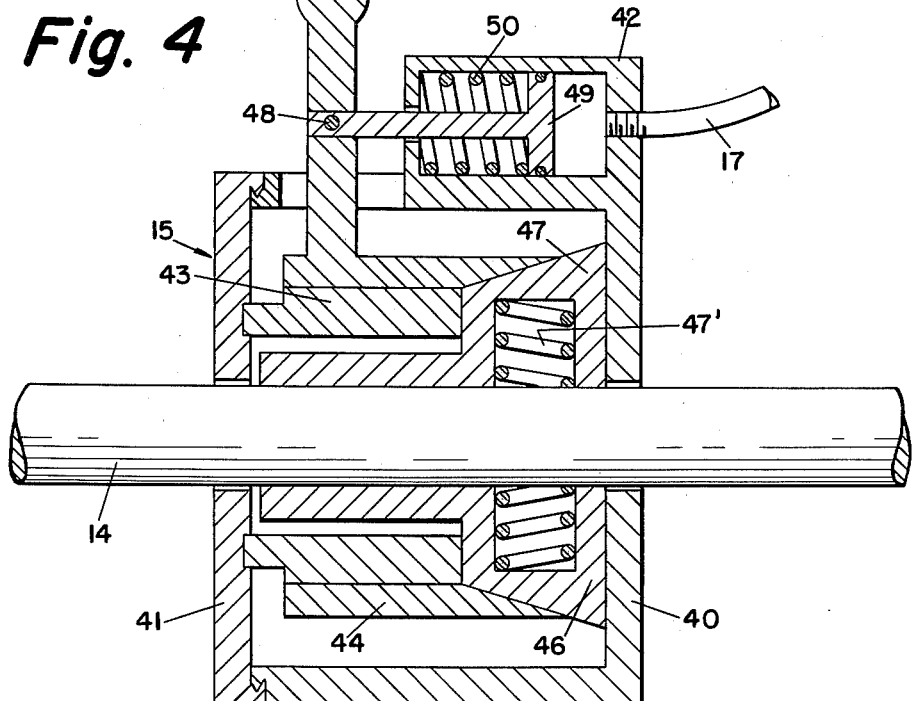
FIG. 4 is a section taken through a latch by which the seat is fixed to or loosened from a support along which it slides.

As indicated by FIG. 4, the latch or clutch 15 may include a casing 40 which has an end cap 41 and a cylindrical extension 42. A cylindrical member 43 is fixed to the end cap 41 and supports an annular member 44 which is beveled at one edge and has fixed to it a handle 45. The beveled surface of the member 44 cooperates with a similar surface of a pair of split rings 46—47 surrounding a spring 47' by which they are biased outwardly. Attached to the handle 45 by a removable pin 48 is a piston 49 which moves in the cylindrical extension 42 and is biased by a spring 50 to a position such that the beveled surfaces are tightly engaged and the seat is latched to the support 14. It is released therefrom by one of two choices (a) by a gas pressure applied through the hose 17 or (b) by moving the handle 45 manually to disengage the beveled surfaces.

With the main piston 29 at the end of its stroke and the seat 13 unlatched from its support, removal of the pin 26 disconnects the tube 24 from the tube 25 so that the seat may be moved manually to any desired point along its support 14. The load positioning device of the present invention thus has the advantage that the load may be positioned manually at any desired point in its travel both before and after the firing of the cartridge which generates its operating gas.

We claim:

1. In a load positioning device, the combination of a main cylinder enclosing a damping fluid and having a fixed end cap, a guide rod fixed to said end cap and extending into said main cylinder, a piston rod including concentric tubular members fixed together and movable along said rod, the inner of said tubular members having an outwardly extending flange at its inner end and the outer of said tubular members having a load actuating member at its outer end, a main piston fixed to said main cylinder by a shear pin and movable against said flange upon the application of pressure thereto and the shearing of said pin, shock absorber means including a chamber interconnected with said main cylinder through a metering passageway, a pressure rupturable disk in said passageway, an auxiliary cylinder opening into said main cylinder, and a spring biased piston movable in said auxiliary cylinder upon the application to said damping fluid of a pressure sufficient to manually position said load and insufficient to shear said pin or rupture said disk.

2. A device according to claim 1 wherein means are provided for detaching said tubular members from one another whereby said load actuating member may be manually positioned when said main piston is at the end of its stroke.

3. A device according to claim 1 wherein the load to be positioned is a seat movable along a support, said seat being coupled to said support through a clutch and said clutch including a control member operable either manually or by a gas pressure.

References Cited in the file of this patent
UNITED STATES PATENTS

| | | |
|---|---|---|
| 2,733,027 | Gero | Jan. 31, 1956 |
| 2,815,008 | Hirt | Dec. 3, 1957 |
| 2,873,726 | Stott | Feb. 17, 1959 |